United States Patent
Katoh

(10) Patent No.: US 6,200,030 B1
(45) Date of Patent: Mar. 13, 2001

(54) SLIDING UNIT WITH SEALING MEANS

(75) Inventor: Masataka Katoh, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 0 days.

(21) Appl. No.: 09/300,394

(22) Filed: Apr. 27, 1999

(30) Foreign Application Priority Data

May 11, 1998 (JP) .................................................. 10-146494

(51) Int. Cl.[7] ................................................... F16C 29/08
(52) U.S. Cl. ............................... 384/15; 74/89.15; 74/566
(58) Field of Search ................................ 384/15; 74/608, 74/89.15, 424.8 R, 566; 277/634, 921

(56) References Cited

U.S. PATENT DOCUMENTS

| | | | |
|---|---|---|---|
| 1,431,084 | * 10/1922 | Anglemyer | 74/566 |
| 2,497,916 | * 2/1950 | Stambaugh | 244/63 |
| 3,428,272 | * 2/1969 | Feder | 244/63 |
| 4,376,543 | * 3/1983 | Sakagami | 384/15 |
| 4,953,424 | * 9/1990 | Lazzari | 74/566 |
| 5,713,244 | * 2/1998 | Ito et al. | 74/89.15 |

FOREIGN PATENT DOCUMENTS 11-030234  2/1999 (JP) .

* cited by examiner

Primary Examiner—David A. Bucci
Assistant Examiner—William C Joyce
(74) Attorney, Agent, or Firm—Browdy and Neimark

(57) ABSTRACT

A sliding unit having sealing means for closing gaps between a track rail and a dustproof cover. The sealing means is comprised of expansible sealing members that permit flanges for mounting an object on a sliding element to move through the sealing means. The flanges extend laterally through the gaps between the dustproof cover and side walls of the track rail. The expansible sealing members are arranged at the widthwise-opposing sides of the track rail so as to close the gaps around the flanges, resulting in keeping the sliding unit from the contamination of foreign bodies such as dust and dirt. The expansible sealing members face to the lateral extensions of the flanges in a sliding contact manner so as to help ensure the unobstructed movement of the flanges.

9 Claims, 7 Drawing Sheets

SLIDING UNIT WITH SEALING MEANS

BACKGROUND OF THE INVENTION

1. Field of the Invention

The present invention relates to a sliding unit adapted for use in, for example, machine tools, assembly machine, testing instruments or the like, and more particularly a sliding unit having sealing means for keeping relatively sliding regions from the contamination of foreign materials such as dust and dirt.

2. Description of the Prior Art

The recently remarkable development in mechatronics technology requires increasingly the general-purpose sliding units. Although the sliding means or units have been now employed extensively in various fields such as machine tools, semiconductor manufacturing apparatus, transportation apparatus, industrial robots and the like, the need of the sliding units extends into many technical fields. With the expansion of uses, the sliding units become required more and more to deal with the precision, high-speed moving, easy assemblage, wide applicability and the like.

The sliding unit is in general comprised of a track rail mounted on a machine bed or the like, a sliding element such as a workpiece table movable along the track rail, and a driving mechanism for moving linearly the sliding element on the track rail. The driving mechanism is, for example, comprised of a screw shaft drivingly mating with a screw nut fixed to the sliding element, supporting brackets for bearing the screw shaft at its lengthwise opposing ends, and driving means such as a motor mounted to any one of the supporting brackets so as to rotate the screw shaft. On the sliding units of the type described above, the sliding element, or the slider, may be either positioned on the track rail or guided along the track rail by electrically controlling the driving means.

Shown in FIGS. 12 to 14 is the sliding unit disclosed in Japanese Patent Laid-Open No. 30234/1999.

The sliding unit 1 in FIGS. 12 to 14 is primarily comprised of an elongated track rail 2 having an U-shaped traverse cross-section, a sliding element 3 movably accommodated in an U-shaped recess 5 of the track rail 2, a screw shaft 4 mating with the sliding element 3, and a driving motor 9 for rotating the screw shaft 4. The screw shaft 4 is supported for rotation in first and second bearing members 11, 12 at the lengthwise opposing ends of the track rail 2. The motor 9 is mounted to the first bearing member 11 near the motor and the track rail 2 is fixed to a base by means of any suitable means such as screws. The sliding element 3 is constructed so as to move linearly on the track rail 2 through, for example, a linear motion guide mechanism. A bottom 6 and a pair of upright side walls 7 define in combination the U-shaped recess 5 in the track rail 2. The side walls 7 are provided on their widthwise opposing inner surfaces 33 with raceway grooves 8 that extend in parallel with each other lengthwise along the track rail while the sliding element 3 has raceway grooves, not shown, confronting the raceway grooves 8. Rolling elements may run through raceways, which are defined between the raceway grooves 8 on the wide walls 7 and the raceway grooves on the sliding element, thereby making the sliding element 3 move smoothly on the track rail 2.

The sliding element 3 has a pair of widthwise opposing upright flanges 13, which are to mount an object such as a workpiece table, not shown, on the sliding element. The flanges 13 are formed with threaded holes 14 for fixture means such as screws. A dustproof cover 15 is attached to the bearing members 11, 12 by means of fixing bolts so as to shield the track rail 2.

The dustproof cover 15 extends over the driving mechanism of the sliding unit 1, that is, the sliding element 3 and the screw shaft 4 accommodated in the track rail 2 to protect the driving parts from foreign bodies that might otherwise fall on or invade into the driving mechanism. The dustproof cover 15 is further formed with matching holes in alignment with the locations where the fixing bolts are driven. A pair of the upright flanges 13, on which the object to be moved is loaded, is formed so as to unobstructively face the dustproof cover 15. To this end, the upright flanges 13 each extend widthwise outwardly of the sliding element 3 and then turn upwardly to thereby provide a substantially L-shape in front view. The object such as a workpiece table is mounted on the flanges 13 with bolts that fit in matching holes 14. As will be seen from the foregoing, relatively moving the sliding element 3 to the track rail 2 causes the object mounted on the sliding element 3 to traverse with respect to the base.

Fixed to the sliding element 3 with screws 18 is a nut 17 formed with an internal helical groove that mates with an external helical groove provided around the periphery of the screw shaft 4. The combination of the screw shaft 4 with the nut 17 constitutes a torque-to-thrust conversion mechanism in which the rotation of the axially fixed screw shaft 4 results in driving linearly the rotationally fixed nut 17 along the track rail 2. To help ensure the reliable smooth linear movement of the sliding element 3, rolling elements are loaded so as to run in a circulating manner between the confronting helical grooves of the screw shaft and the nut whereby the torque-to-thrust conversion mechanism is designed as a ball nut and screw shaft assembly, which is comprised of the screw shaft 4, nut 17 and circulating rolling elements. The sliding element 3 is provided on its widthwise opposing side surface with raceway grooves to form raceways for running the rolling elements in cooperation with the raceway grooves 8 in the track rail 2. In addition, the casing of the sliding element 3 includes therein return-paths for the rolling elements.

Fixed on railheads 20 of the side walls in the track rail 2 with screws are bearing members 11, 12 that support the screw shaft 4 for rotation at its lengthwise ends. The raceway grooves 8 and the railheads 20 in the track rail 2 are finished in parallel with each other. Therefore, simply fixing the bearing members 11, 12 on the railheads 20 of the track rail 2 with horizontal position alignment may be sufficient to arrange the screw shaft 4 on the track rail 2 in the sliding element 3 in accurate alignment with the moving direction of the sliding element 3, with no necessity of vertical position adjustment.

Sensor rails 21 are disposed widthwise outwardly of the side walls 7 of the track rail 2 and bolted at 22. Sensors 23 are arranged on the sensor rails 21 at positions that are to be identified such as the beginning. Signals issued from the sensors 23 that have detected the flanges 13 are input to a controller unit, not shown, through a lead wire 24 and a sensor connector 25 and then control signals from the controller unit are applied to the motor 9 such as a stepping motor.

As shown in FIGS. 12 to 14, the sensor rails 21 are each provided therein with a furrow 26 extending along the lengthwise direction of the rail, in which may be kept the lead wire 24. Further, the sensor rails 21 form side covers 27 to shield the track rail 2 and the sliding element 3 on their widthwise-opposing sides. Formed at the bottom 6 of the track rail 2 are holes 29 matching with bolts to fix the track rail 2 onto the base. The holes 29 are bored in tow rows and spaced apart from each other with a predetermined distance. The torque of the motor 9 is transmitted to the screw shaft 4 through a coupling 30. The permissible span of the reciprocating movement to the sliding element 3 is defined with stoppers 31, 32 that are secured to the bearing members 11, 12, one to each bearing member.

In the meantime, as the flanges 13 on which the workpiece table is to be mounted move integrally with the sliding element 3, the sliding unit 1 of the type as described above is necessarily provided with gaps or clearances L for permitting the movement of the flanges 13 therethrough. Although the sensor rails 21 constitute the side covers 27 that partly conceal the relatively sliding region, no design is proposed for substantially completely shield the gaps or clearances L and, therefore, the prior art makes it impossible to keep completely the sliding unit 1 from foreign bodies that invade into the driving mechanism through the gaps or clearances L.

To cope with the antinomic problem in the prior sliding unit, wherein the flanges are allowed to move unobstructively while the interior of the sliding unit may be effectively purged of the invasion of foreign bodies such as dust and dirt, the inventor has considered employing a expansible sealing members that close normally the gaps open between the dustproof cover and the track rail and may be elastically collapsed so as to form slits for permitting the movement of the flanges, on which the object is to be mounted, with the passage of the flanges.

SUMMARY OF THE INVENTION

The present invention, therefore, has as its primary object to overcome the problem as described just above and more particular to provide an improved sliding unit with sealing means simple in structure and inexpensive, in which flanges, on which the object is to be mounted, make it possible to move through gaps open between track rail and the dustproof cover and expansible sealing members close normally the gaps, while are elastically deformed with the movement of the flanges, whereby the interior of the sliding unit may be effectively purged of the invasion of foreign bodies such as dust and dirt.

The present invention is concerned with a sliding unit with sealing means, comprising a track rail having a pair of lengthwise side walls opposing to each other widthwise of the tack rail, a sliding element movable on the track rail, a dustproof cover arranged extending lengthwise of the track rail over both the track rail and sliding element, flanges for supporting thereon an object to be loaded on the sliding element, the flanges being formed integrally with the sliding element so as to extend through gaps between the confronting surfaces of the dustproof cover and the side walls of the track rail, and elastically expansible sealing members arranged to close the gaps, the sealing members being each secured at one lengthwise edge thereof to any one of the dustproof cover and the associated side wall of the track rail and kept at the other edge thereof in sliding contact with the associated flange constantly whenever the sliding element moves on the track rail whereby the sealing members are subject to the elastic expansile and collapsed deformation as the flanges pass through the gaps on the movement of the sliding element along the track rail.

In one aspect of the present invention, the expansible sealing members are secured at the lengthwise edges thereof to railheads of the side walls in the track rail while brought at the other edges thereof into contact with an undersurface of the dustproof cover and kept in sliding contact with undersides of the flanges. As an alternative, the expansible sealing members are secured at the lengthwise edges thereof to the undersurface of the dustproof cover while brought at the other edge thereof into contact with the railheads of the side walls in the track rail and kept in sliding contact with upper sides of the flanges. When the flanges move through the gaps, the expansible sealing members are collapsed compressively towards the railheads of the side walls in the track rail or the undersurface of the dustproof cover. In contrast, just after the flanges have gone past, the expansible sealing members are elastically restored to the initial expansile event to thereby again make the contact with the side walls or the dustproof cover.

In another aspect of the present invention, a sliding unit is disclosed wherein any one of the expansible sealing members is composed of at least a pair of expansible sealing sub-members, one of which is secured at one lengthwise edge thereof to any one of the dustproof cover and the side wall of the track rail, the other sub-member being secured at one lengthwise edge thereof to the other of the dustproof cover and the side wall of the track rail, and the flanges are movable between the sealing sub-members along the track rail in a sliding contact with the confronting free edges of the sealing sub-members. The sealing sub-members are collapsed compressively so as to space apart from each other towards the railheads of the side walls in the track rail and the undersurface of the dustproof cover when the flanges move through between the sub-members. After the flanges have gone past, the expansible sealing sub-members expand elastically to thereby make abutment against each other.

In another aspect of the present invention, a sliding unit is disclosed wherein the flanges are each provided with fore-and-aft tapered ends at which surfaces being in contact with expansible sealing members are inclined with respect to the moving direction of the flanges, whereby the expansible sealing members may collapse and expand successively and gradually with the movement of the flanges on the track rail. In accordance with this aspect, the expansible sealing members, as the flanges move, are collapsed compressively by virtue of inclined planes on the leading ends of the flanges and, after the flanges have passed through, are permitted to expand gradually along the inclined planes on the trailing ends of the flanges.

In a further another aspect of the present invention, the expansible sealing members are of cylindrical members each containing airtight plenum. Moreover, the cylindrical members of airtight plenum may be filled with a fluid.

In another aspect of the present invention, the expansible sealing members may be each comprised of bellows-like members having folds extending in parallel with the moving direction of the sliding element. In addition, the expansible sealing members may be each comprised of at least one pair of confronting bellows-like members extending lengthwise of the track rail, and a pair of sheets connecting at lengthwise edge thereof the bellows-like members to each other.

In another aspect of the present invention, a sliding unit is disclosed wherein a fluid is contained in each space defined by the bellows-like members and the sheets for the expansible sealing members.

In another aspect of the present invention, any one of the sheets of the expansible sealing member, being in sliding contact with the flanges, is applied with an antifriction tape to reduce the sliding resistance between the flanges and the expansible sealing members. As an alternative, the antifriction tape is made of magnetic tape while the side walls of the track rail and the dustproof cover contain magnetic substance so that the antifriction tape is detachably brought into contact with the side walls or dustproof cover by the action of magnetic attraction. The magnetic metal tape is high in bending strength and also in wear proof so that it may be improved in durability against the repetition of engaging and disengaging from the confronting surfaces or other sealing members. The magnetic attraction on the magnetic tape helps ensure the reliable dust-tight engagement of the expansible sealing member with the associated surface.

In accordance with the sliding unit constructed as described above, the gaps or clearances between the railheads of the side walls in the track rail and the undersurface of the dustproof cover are closed with at least one expansible sealing member having elasticity, which is attached to any one of the railheads of the side walls in the track rail and the undersurface of the dustproof cover. On the sliding element moving on the track rail, the expansible sealing members are collapsed towards any one of the confronting surfaces defining the gaps, thereby providing slits for permitting the flanges to move through the gaps. It will be thus understood that the expansible sealing members may collapse and expand depending on the movement of the flanges to thereby close elastically the gaps around the flanges continuously whenever the sliding element moves on the track rail.

The expansible sealing members secured to any one of the railheads of the side walls in the track rail and the undersurface of the dustproof cover, as the sliding element is moved on the track rail, are separated from the other of the railheads and the dustproof cover or the confronting expansible sealing members forced to be abutted against each other. Just after the flanges have gone past, the expansible sealing members expand elastically to the initial posture in which they are brought into abutment against either any of the dustproof cover and the railheads or the confronting sealing members, thereby closing the gaps between the dustproof cover and the side walls of the track rail with the cooperation of the sliding element with the expansible sealing members. Consequently, the gaps may be closed with the expansible sealing members whereby the sliding unit is protected from the contamination of external foreign bodies such as dust and dirt.

The above and other related objects and features of the present invention will be more apparent to those skilled in the art from a reading of the following description of the disclosure found in the accompanying drawings and the novelty thereof pointed out in the appended claims.

DETAILED DESCRIPTION OF THE PREFERRED EMBODIMENTS

Referring now in detail to the drawings, a sliding unit having sealing means according to the present invention will be explained below.

Figure 12:
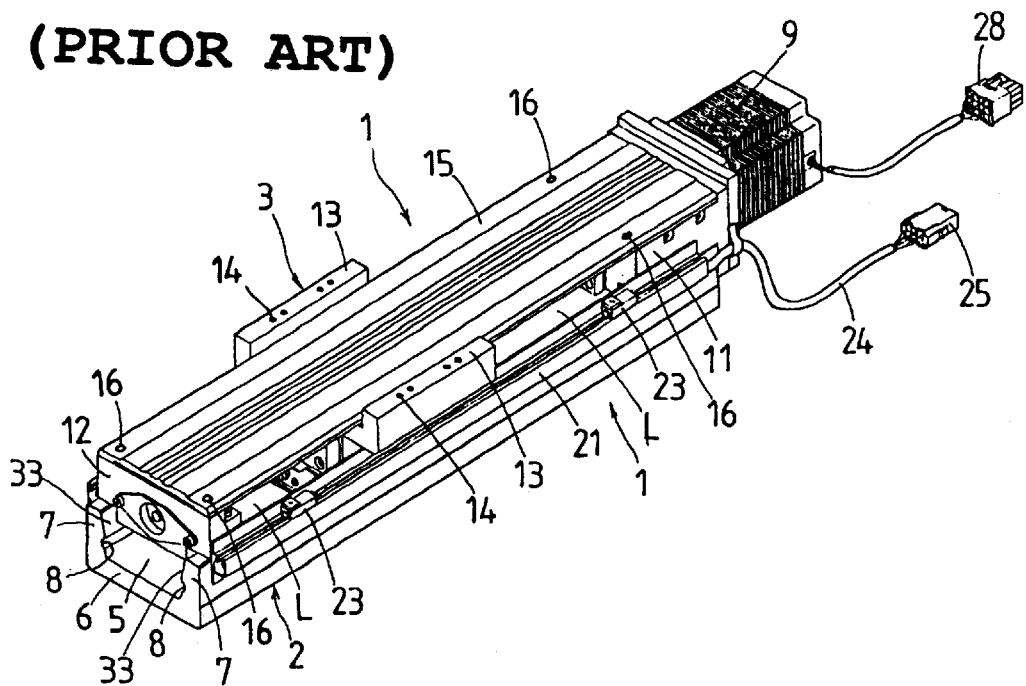
FIG. 12 is a perspective view of the sliding unit disclosed in the co-pending prior application in Japan, but in which a dustproof cover is incorporated.
Figure 13:
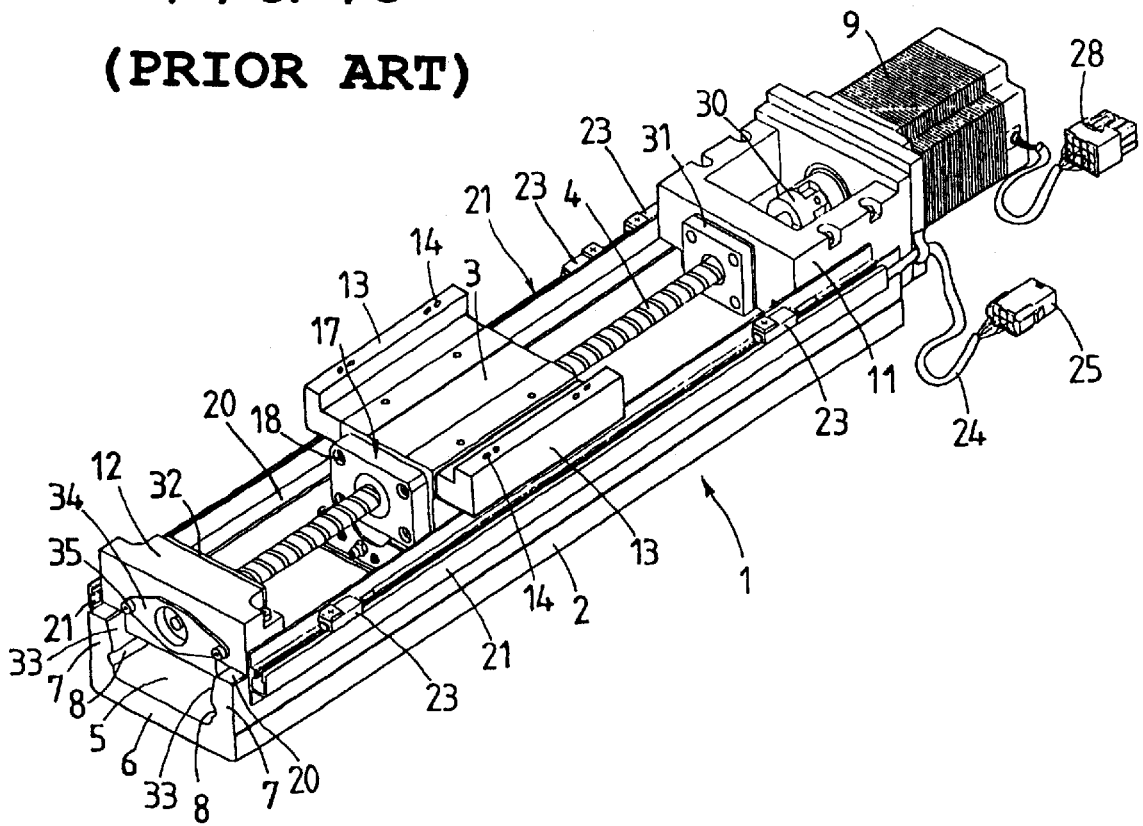
FIG. 13 is a perspective view of the sliding unit shown in FIG. 12, but in which a dustproof cover is removed.
Figure 14:
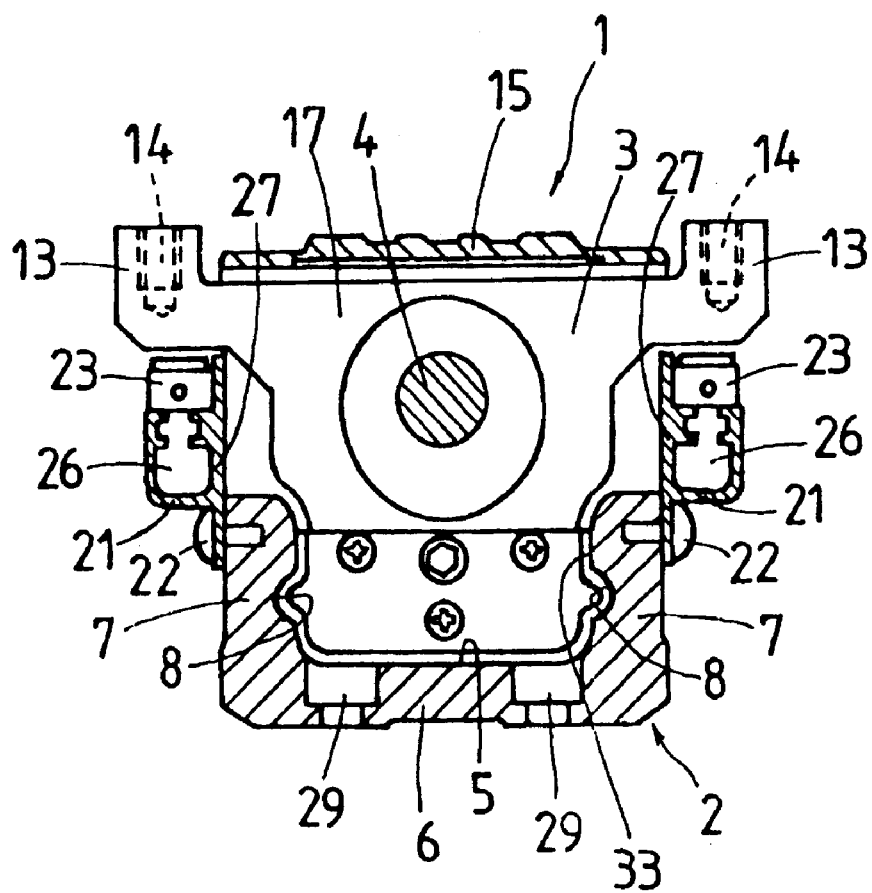
FIG. 14 is a traverse cross-sectional view of the sliding unit shown in FIG. 12, the view being taken in perpendicular to the screw shaft on any plane between a sliding element and a bearing member for the screw shaft.

Referring to FIGS. 1 to 4 illustrating a preferred first embodiment of the present invention, the sliding unit 1 in FIGS. 1 to 4 is substantially the same as the sliding unit previously described in reference to FIGS. 12 to 14. To that extent, the same reference character identifies equivalent or same components in the sliding unit shown in FIGS. 12 to 14, so that the previous description will be applicable.

Figure 1:
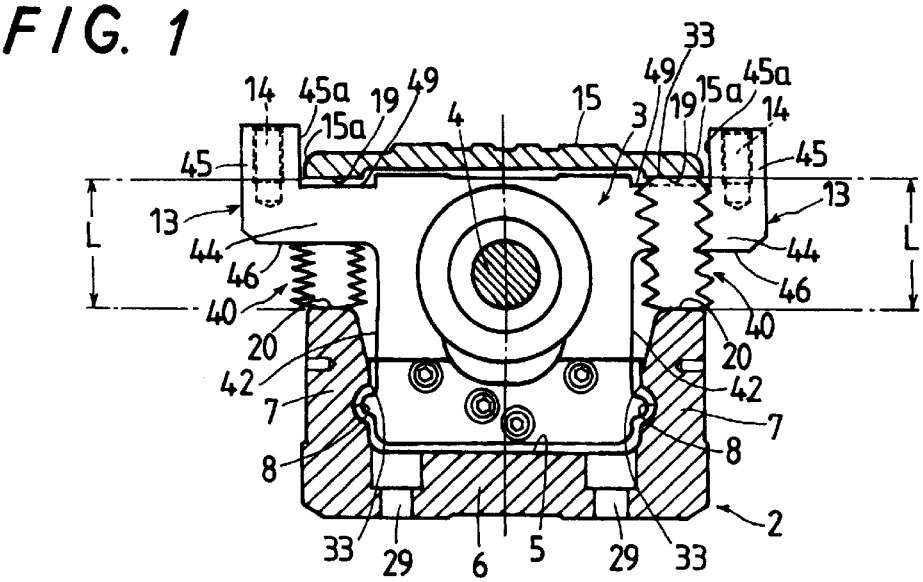
FIG. 1 is a traverse cross section showing a preferred first embodiment of a sliding unit having sealing means according to the present invention.
Figure 2:
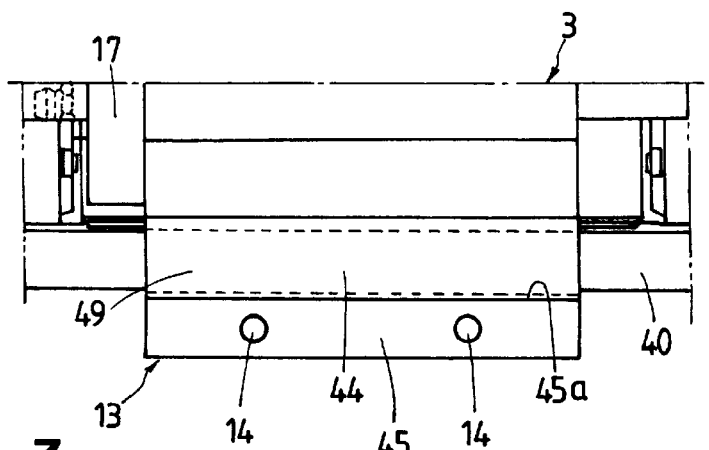
FIG. 2 is a partial top plan view of the sliding unit shown in FIG. 1, but in which a dustproof cover is removed.
Figure 3:
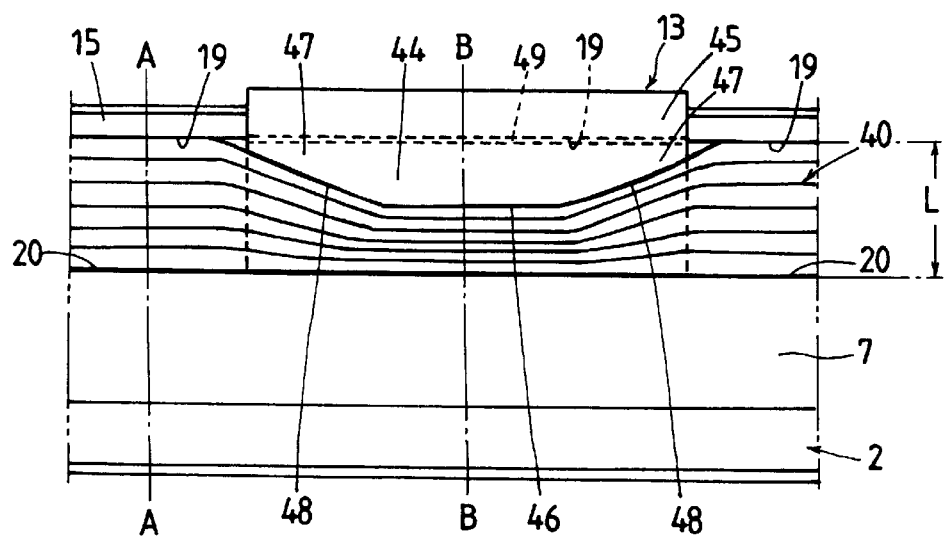
FIG. 3 is a partial side elevation of the sliding unit shown in FIG. 1.
Figure 4:
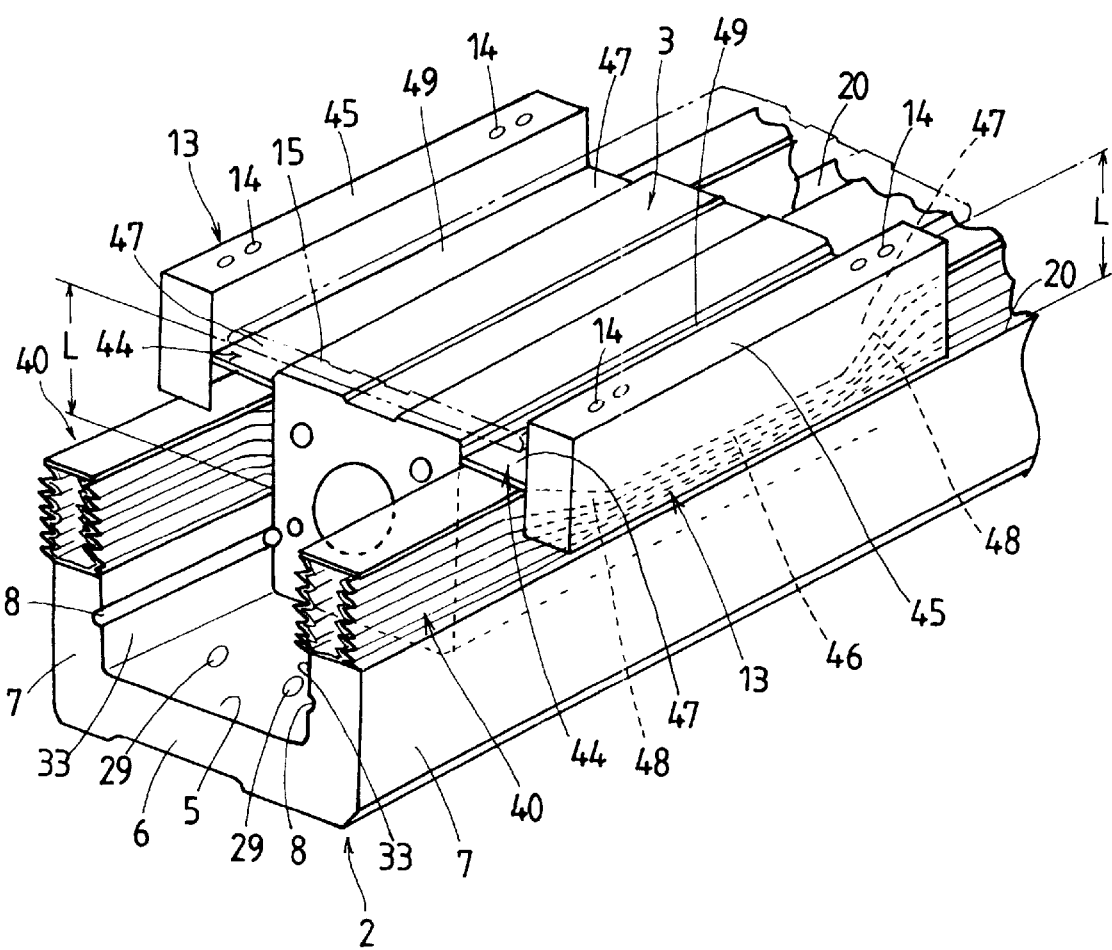
FIG. 4 is a partial perspective view, partly broken away, of the sliding unit shown in FIG. 1, but in which a part including the dustproof cover is omitted.

The right half of FIG. 1 shows the location taken along the line A—A of FIG. 3, where the sealing means is free from the associated flange 13, whereas the left half of FIG. 1 illustrates another location taken along the line B—B of FIG. 3, where the sealing means is elastically collapsed under the action of the associated flange 13.

The elongated track rail 2 has an U-shaped traverse cross-section that is defined by the bottom 6 and the widthwise-opposing upright side walls 7. The sliding element 3 is accommodated for sliding movement along the track rail 2 in the recess 5 defined with the side walls 7. The sliding element 3 extends partially over the railheads 20 of the side walls 7 to the outside. The dustproof cover 15 is arranged over the sliding element 3 and the track rail 2 to protect them from the contamination of the foreign bodies such as dust and dirt and fixed to the bearing members 11, 12 that are secured to the track rail 2 for supporting the screw shaft. It will be thus understood that the dustproof cover 15 confronts the side walls 7 of the track rail 2 so as to leave the lengthwise gaps or opening L between the confronting undersurface 19 and the railheads 20.

The flanges 13 for supporting thereon the object such as a workpiece table extend widthwise from side surfaces 42 of the sliding element 3. The flanges 13 each have a substantially L-shape in front view, which is composed of a lateral extension 44 extending widthwise outwardly of the sliding element 3, and an upright projection 45 turning upwardly at the extremity of the extension 44 and then elongating over the dustproof cover 15 at the lateral outside of the dustproof cover 15. The lateral extensions 44, as seen from FIG. 3, each have an underside 46 that has at its fore-and-aft midway region a horizontal plane 46 parallel with the railhead 20 of the associated side wall 7 of the track rail 2 while at the fore-and-aft end regions 47 inclined planes 48 merging with the midway plane 46 and slantwise upwardly extending with respect to the moving direction of the sliding element 3. Moreover, the lateral extensions 44 of the flanges 13 are each arranged relatively to the dustproof cover 15 so as to make exceedingly small of a clearance between its upper surface 49 and the undersurface 19 of the dustproof cover 15, thereby preventing the invasion of the foreign bodies such as dust and dirt with no sliding resistance coming into action when the sliding element is moved. In addition, a clearance between any side surface 15a of dustproof cover 15 and its associated inner side surface 45a of the upright projection 45 of the flange 13 is made smaller, thereby rendering the sliding unit 1 compact in widthwise dimension. The inclined planes 48 are designed so as to make contact with the undersurface 19 of the dustproof cover 15 at a moderate slantwise angle.

In the sliding unit according to the present invention, expansible sealing members 40 are disposed between the undersurface 19 of the dustproof cover 15 and the railheads 20 of the side walls 7 in the track rail 2. As apparent from FIG. 11, the expansible sealing members 40 are each composed of confronting bellows-like members 82, 83 each of which is corrugated with folds 81 extending in parallel with the lengthwise direction of the track rail 2. Each expansible sealing member 40 is secured to the associated railhead 20 of the side wall 7 in the track rail 2 by the use of fixing means such as adhesives. Each expansible sealing member 40 has the strong elasticity that may exert the vertically expansive force, resulting in forcibly urging an upper sheet 85 of the expansible sealing member 40 against the undersurface 19 of the dustproof cover 15.

While the flanges 13 move linearly through the gaps L between the side walls 7 of the track rail 2 and the dustproof cover 15 on the movement of the sliding element 3 relatively of the track rail 2, the expansible sealing members 40 under the expanded event, in which the upper sheets 85 are abutted against the undersurface 19 of the dustproof cover 15, are elastically collapsed towards the railheads 20 of the side walls 7 in the track rail 2 by virtue of the inclined plane 48 on the leading end region 47 of the lateral extensions 44 on the flanges 13. The expansible sealing members 40 are fully collapsed or contracted under the midway region of the horizontal plane 46.

According to the sliding unit of the present invention, with the sliding element 3 moving on the track rail 2, the expansible sealing members 40 are collapsed successively and gradually by the guiding action of the inclined planes 48 and horizontal plane 46, which are formed on the underside 46 of the lateral extensions 44 on the sliding element 3, thereby providing slits for permitting the flanges 13 to move along the track rail 2. It will be thus noted that the upper sheets 85 of the expansible sealing members 40 may keep the contact with all the inclined planes 48 and horizontal plane 46 on the lateral extensions 44 of the sliding element 3 continuously whenever the sliding element 3 moves on the track rail 2. Just after the flanges 13 have gone past, the expansible sealing member s 40 are elastically restored to the initial dustproof cover 15, thereby closing the gaps L between the dustproof cover 15 and the side walls 7 of the track rail 2 to help ensure the dust-tightness. The inclined planes 48 on the fore-and-aft regions 47 are designed so as to merge with the undersurface 19 of the dustproof cover 15 with no discontinuity therebetween. There is substantially no clearance between the dustproof cover 15 and either of the lateral extensions 44 and the upright projections 45 and, therefore, the dustproof performance may be constantly ensured, whether the expansible sealing members 40 are in the expansion phase or in the transition phase from the expansion phase to the collapsed phase and vice versa. The sliding unit, for example, used in the welding shop may be protected from the contamination of the foreign bodies such as sputter, which might otherwise invade the interior of the sliding unit 1 through the gaps L.

The sliding element 3 is comprised of a casing provided with raceway grooves confronting the raceway grooves 8 that are formed on the widthwise opposing inner surfaces 33 of the side walls 7, rolling elements running through raceways defined between the confronting raceway grooves, end caps attached to the lengthwise opposing end of the casing, and end seals mounted on the end caps. The sliding element 3 is snugly fitted without rattling between the side walls 7 of the track rail 2 through the rolling elements. The sliding element 3, as having the primary structure of the linear motion guide mechanism, may move smoothly on the track rail 2 and further make it possible to accurately control its position and moving velocity.

Next referring to FIGS. 5 and 6, the second embodiment of the sliding unit having the sealing means of the present invention will be described hereinafter. On this second embodiment, expansible sealing members 50 are secured to the undersurface 19 of the dustproof cover 15.

Compared with the first embodiment of the present invention, the second embodiment is substantially identical in structure, with the exception of structural relation of the expansible sealing members 50 with the flanges 13a. Hence, similar reference characters designate similar elements or components and the previous description regarding the first embodiment will be applicable.

Figure 5:
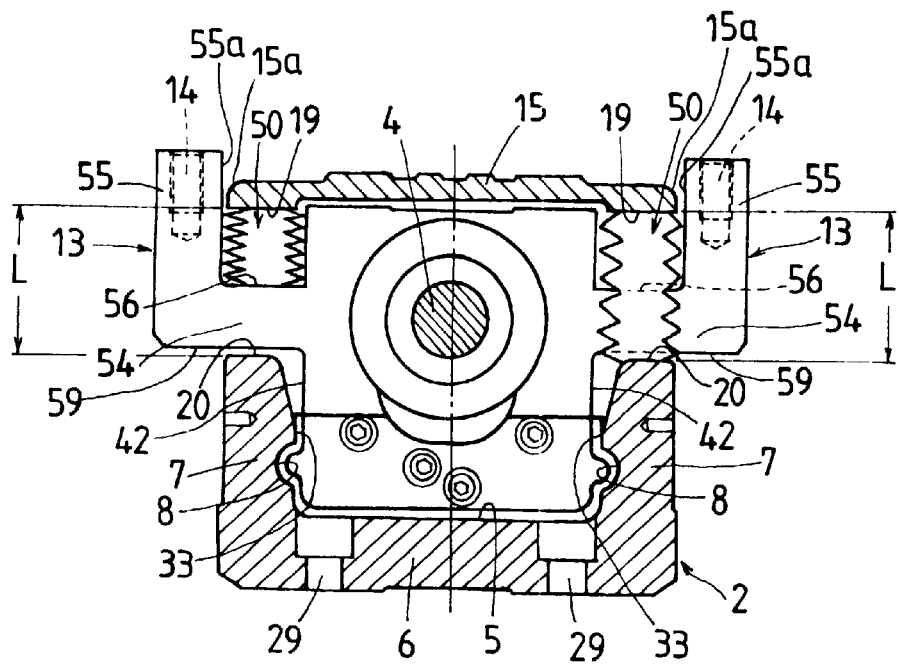
FIG. 5 is a traverse cross section showing a second embodiment of a sliding unit having sealing means according to the present invention.
Figure 6:
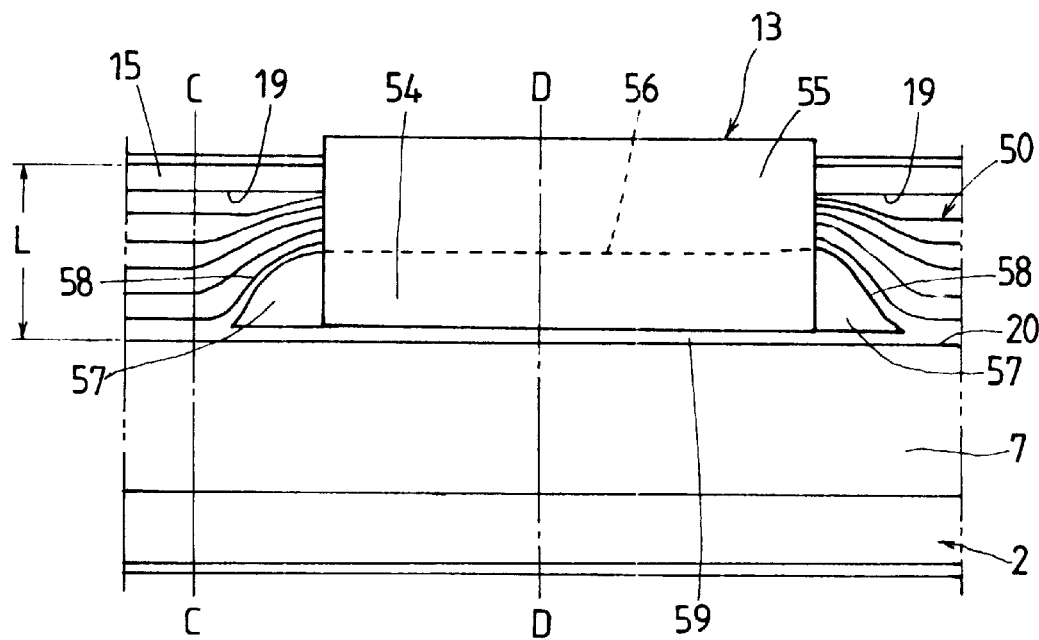
FIG. 6 is a partial side elevation of the sliding unit shown in FIG. 5.

The right half of FIG. 5 shows the location taken along the line C—C of FIG. 6, where the sealing means is free from the associated flange 13, whereas the left half of FIG. 5 illustrates another location taken along the line D—D of FIG. 6, where the sealing means is elastically collapsed under the action of the associated flange 13.

In the second embodiment, the flanges 13 extending widthwise from the side surfaces 42 of the sliding element 3 are each formed in a substantially L-shape in front view, which is composed of a lateral extension 54 extending widthwise outwardly of the sliding element 3, and an upright projection 55 turning upwardly at the extremity of the extension 54 and then elongating over the dustproof cover 15 at the lateral outside of the dustproof cover 15. The lateral extensions 54, as seen from FIG. 6, each have an upper surface 56 and an underside 59, both of which are of horizontal planes. Each lateral extension 54 is further provided with fore-and-aft ends 57, which expand along the moving direction of the sliding element 3. The fore-and-aft ends 57 have inclined planes 58, each of which extends slantwise upwardly, beginning at near the associated railhead 20 of the side wall 7 of the track rail 2, and merges stepless-wise with the upper surface 56.

The lateral extensions 54 of the flanges 13 are each arranged relatively to the associated side wall 7 of the track rail 2 so as to make exceedingly small of a clearance between its underside 59 and the railhead 20 of the side wall 7 in the track rail 2, thereby preventing the invasion of the foreign bodies such as dust and dirt with no relatively sliding resistance occurring when the sliding element is moved. Moreover, there is substantially no clearance between any side surface 15a of dustproof cover 15 and its associated inner side surface 55a of the upright projection 55 of the flange 13, thereby rendering the sliding unit 1 compact in widthwise dimension.

In the sliding unit according to second embodiment of the present invention, expansible sealing members 50 are disposed between the undersurface 19 of the dustproof cover 15 and the railheads 20 of the side walls 7 in the track rail 2. The sealing members 50 may be of the structure equivalent or identical with that of FIG. 11. Each expansible sealing member 50 is secured to the undersurface 19 of the dustproof cover 15 by the use of fixing means such as adhesives. Each expansible sealing member 50 has corrugations of the strong elasticity that may exert the vertically expansive force, so that the bottom sheet 85 of the expansible sealing member 50 is forcibly abutted against the railhead 20 of the side wall 7 in the track rail 2 by the action of the vertical expansive force as well as the tare thereof. The expansible sealing member 50 on the second embodiment may help ensure the desired dustproof performance owing to the tare thereof, even if it is less in elasticity compared with the expansible sealing member 40 on the embodiment shown in FIGS. 1 to 3.

In accordance with the sealing means of the second embodiment constructed as described above, with the flanges 13 moving linearly through the gaps L between the railheads 20 of the side walls 7 in the track rail 2 and the dustproof cover 15 on the movement of the sliding element 3 relatively of the track rail 2, the sealing members 50 in expansion phase abutting against the railheads 20 of the side walls 7 in the track rail 2 are elastically collapsed upwardly towards the undersurface 19 of the dustproof cover 15 by virtue of the inclined plane 48 on the leading ends 57 of the lateral extensions 54 on the flanges 13. The expansible sealing members 50 are fully collapsed or contracted at the horizontal upper planes 56 of the lateral extensions 54. The expansible sealing members 50 in collapsed phase provide the slits for permitting the flanges 13 of the sliding element 3 to move along the track rail 2. It will be thus noted that the bottom sheets 85 of the expansible sealing members 50 may keep the contact with the horizontal upper planes 56 on the lateral extensions 44 of the sliding element 3 continuously whenever the sliding element 3 moves on the track rail 2. As soon as the flanges 13 have gone past, each expansible sealing members 50 recovers elastically its initial posture owing to its own expansile force, in which the sealing members are free from the flanges so as to make abutment against the railheads 20 of the side walls 7 in the track rail 2, thereby closing the gaps L between the undersurface 19 of the dustproof cover 15 and the railheads 20 of the side walls 7 of the track rail 2 to help ensure the dust-tightness.

Meanwhile the inclined planes 58 on the fore-and-aft ends 57 are designed so as to merge with the railheads 20 of the side walls 7 in the track rail 2 with no discontinuity therebetween and, moreover, there is substantially no clearance between the lateral extensions 54 of the flanges 13 and the railheads 20 of the side walls 7 in the track rail 2. Hence, the dustproof performance may be constantly ensured, whether the expansible sealing members 50 are in the expansion phase or in the transition phase from the expansion phase to the collapsed phase and vice versa. This makes it possible to protect the sliding unit from the contamination of the foreign bodies such as dust and dirt, which might otherwise invade the interior of the sliding unit 1.

Figure 7:
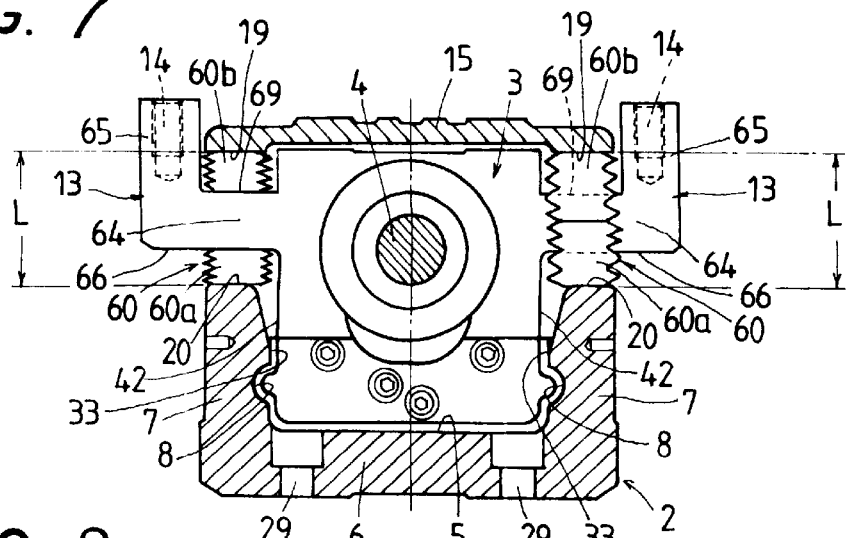
FIG. 7 is a traverse cross section showing a third embodiment of a sliding unit having sealing means according to the present invention.
Figure 8:
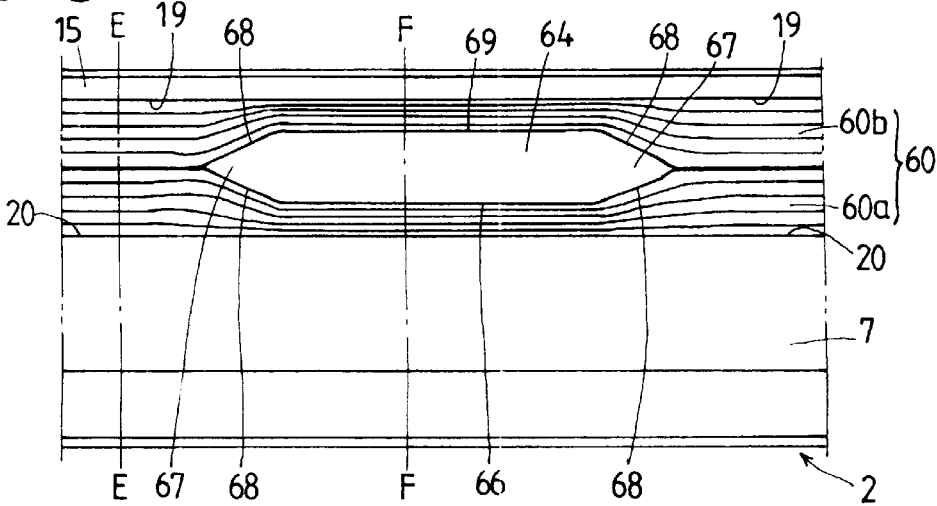
FIG. 8 is a partial side elevation of the sliding unit shown in FIG. 7.

The following will explains the third embodiment of the sliding unit having the sealing means according to the present invention with reference to FIGS. 7 and 8. On this third embodiment, expansible sealing members 60 are each made of a pair of sealing members 60a, 60b, each of which is secured any one of the undersurface 19 of the dustproof cover 15 and the associated railhead 20 of the side wall 7 in the track rail 2. Compared with the first embodiment of the present invention shown in FIGS. 1 to 4, the third embodiment is substantially identical in structure, with the exception of structures of the expansible sealing members 60 and the flanges 13. Hence, similar reference characters designate similar elements or components and the previous description regarding the first embodiment will be applicable.

Shown on the right half of FIG. 7 is a cross section taken along the line E—E of FIG. 8, where the sealing means is free from the associated flange 13, whereas the left half of FIG. 7 illustrates another cross section taken along the line F—F of FIG. 8, where the sealing means is elastically collapsed under the action of the associated flange 13.

The flanges 13 for supporting thereon the object such as a workpiece table extend widthwise from side surfaces 42 of the sliding element 3. The flanges 13 each have a substantially L-shape in front view, which is composed of a lateral extension 64 extending widthwise outwardly of the sliding element 3, and an upright projection 65 turning upwardly at the extremity of the extension 64 and then elongating over the dustproof cover 15 at the lateral outside of the dustproof cover 15. The lateral extensions 64, as shown in FIG. 8, each have upper and lower surfaces 69, 66, which are converged at 68 to each other so as to form fore-and-aft tapered ends 67. The upper and lower surfaces 69, 66 of the lateral extensions 64 are not limited to the contour shown and may be of the wing-shape symmetrical about the horizontal and vertical planes.

In the third embodiment, the expansible sealing members 60 are each composed of a pair of sealing sub-members 60a, 60b arranged between the associated railhead 20 of the side wall 7 in the track rail 2 and the undersurface 19 of the dustproof cover 15. The sealing sum-members 60a, 60b may be of a pair of the members shown in FIG. 11, which are used opposed back to back with each other. Any one 60a of the sub-members is attached to the associated railhead 20 of the side wall 7 in the track rail 2 while the other 60b is attached to the undersurface 19 of the dustproof cover 15 by any fixing means such as adhesives. The sealing sub-members 60a, 60b each have the elastic force that occurs vertically owing its own corrugation so as to bring the confronting sheets 85, 85 into the elastic abutment with each other.

As the sliding element 3 moves on the track rail 2 and thus the flanges 13 pass through the gaps L between the railheads 20 of the side walls 7 in the track rail 2 and the dustproof cover 15, the lateral extensions 64 of the flanges 13 move, mutually spacing apart the confronting sealing sub-members 60a, 60b from each other by virtue of the guiding action of the inclined planes 68 on the leading ends 67 of the lateral extensions 44 on the flanges 13. The expansible sealing sub-members 60a, 60b are fully collapsed or contracted at the upper and lower horizontal planes 66, 69.

According to the sliding unit of the third embodiment described above, when the sliding element 3 moves on the track rail 2, the sealing sub-members 60a, 60b are collapsed successively and gradually so as to space apart from each other towards the railheads 20 of the side walls 7 in the track rail 2 and the undersurface 19 of the dustproof cover 15 by the guiding action of the inclined planes 68, which are formed at the fore-and-aft ends of the lateral extensions 64 on the sliding element 3, thereby providing slits for permitting the flanges 13 of the sliding element 3 to move along the track rail 2. It will be thus noted that the upper sheets 85 of the sealing sub-members 60a, refer to FIG. 11, may keep the sliding contact with the lower surfaces 66 on the lateral extensions 64 of the sliding element 3 while the lower sheets 85 of the sealing sub-members 60b may keep the sliding contact with the upper surfaces 69 on the lateral extensions 64 of the sliding element 3 continuously whenever the sliding element 3 moves on the track rail 2. Just after the flanges 13 have gone past, the expansible sealing sub-members 60a, 60b are elastically restored to the initial posture in which they are free from the flanges so as to make abutment against each other, thereby closing the gaps between the undersurface 19 of the dustproof cover 15 and the railheads 20 of the side walls 7 in the track rail 2 to help ensure the dust-tightness. The fore-and-aft tapered ends 67 with sharp points are favorable for the smooth separation of the sealing sub-members 60a, 60b apart from each other with the movement of the flanges 13. There happens substantially no clearance between the confronting sealing sub-members 60a, 60b, whether the sealing sub-members 60a, 60b are in the expansion phase or in the collapsed phase by virtue of the moving flanges 13. As a result, the expansible sealing members 60 may keep on closing the gaps L between the undersurface 19 of the dustproof cover 15 and the railheads 20 of the side walls 7 in the track rail 2 and, therefore, the dustproof performance may be constantly ensured.

Figure 9:
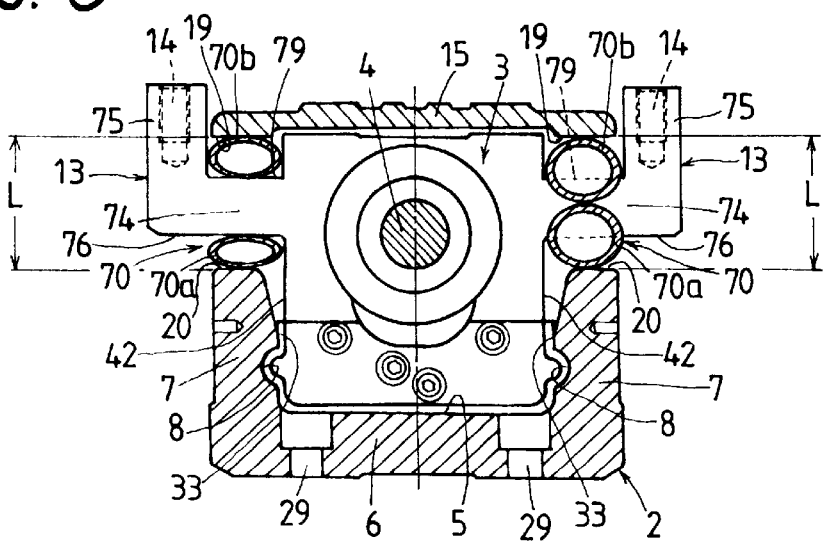
FIG. 9 is a traverse cross section showing a fourth embodiment of a sliding unit having sealing means according to the present invention.
Figure 10:
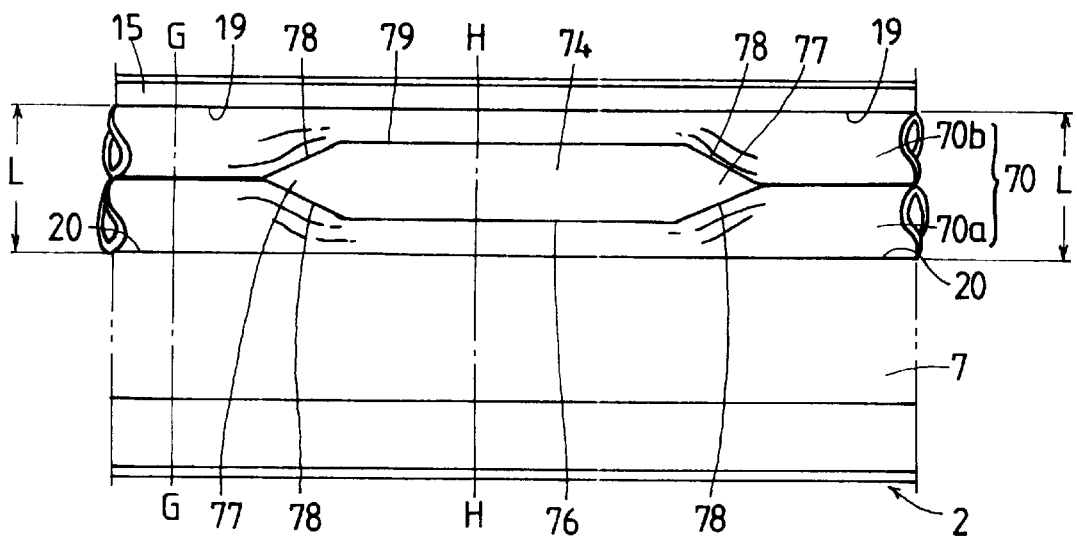
FIG. 10 is a partial side elevation of the sliding unit shown in FIG. 9.

Referring to FIGS. 9 and 10 showing the fourth embodiment of the sliding unit with the sealing means according to the present invention, this fourth embodiment has expansible sealing members 70 of tubular form. The fourth embodiment is substantially identical in structure with the third embodiment shown in FIGS. 7 and 8, except for the expansible sealing members being of tubular form. Hence, similar reference characters designate similar elements or components in the third embodiment.

Shown on the right half of FIG. 9 is a cross section taken along the line G—G of FIG. 10, where the sealing means is free from the associated flange 13, whereas the left half of FIG. 9 illustrates another cross section taken along the line H—H of FIG. 10, where the sealing means is elastically collapsed under the action of the associated flange 13.

In the fourth embodiment, the flanges 13 for supporting thereon the object such as the worktable are each formed in a substantially L-shape in front view, which is composed of a lateral extension 74 extending widthwise outwardly from the side surface 42 of the sliding element 3, and an upright projection 75 turning upwardly at the extremity of the extension 74 and then elongating over the dustproof cover 15 at the lateral outside of the dustproof cover 15. The lateral extensions 74, as shown in FIG. 10, each have upper and lower surfaces 76, 79, which are converged at 78 to each other so as to form fore-and-aft tapered ends 77.

The expansible sealing members 70 for the sealing means according to the fourth embodiment are composed of pairs of tubular sealing members 70a, 70b arranged between the undersurface 19 of the dustproof cover 15 and the railheads 20 of the wide walls 7 in the track rail 2. Any one 70a of the tubular sealing members is secured to the undersurface 19 of the dustproof cover 15 with suitable fixing means such as adhesives while the other 70b is secured to the associated railhead 20 of the side wall 7 in the track rail 2. The tubular sealing members 70a, 70b are brought into elastic contact with each other owing to their own elasticity.

As the flanges 13 move linearly through the gaps L between the side walls 7 of the track rail 2 and the dustproof cover 15 with the movement of the sliding element 3 relatively of the track rail 2, the lateral extensions 74 of the flanges 13 move, separating away from each other the tubular sealing members 70a, 70b under the expanded event, in which they are abutted against each other, so that the sealing members 70a, 70b are elastically collapsed by virtue of the inclined planes 78 at the fore-and-aft leading ends 77 of the lateral extensions 74. The expansible tubular sealing members 70a, 70b are fully collapsed or contracted at the upper and lower horizontal planes 76, 79. Consequently, the tubular sealing members 70a, 70b are kept on contact with each other and the lateral extensions 74 continuously whenever the sliding element 3 moves on the track rail 2 thereby closing the gaps L between the side walls 7 of the track rail 2 and the dustproof cover 5.

Figure 11:
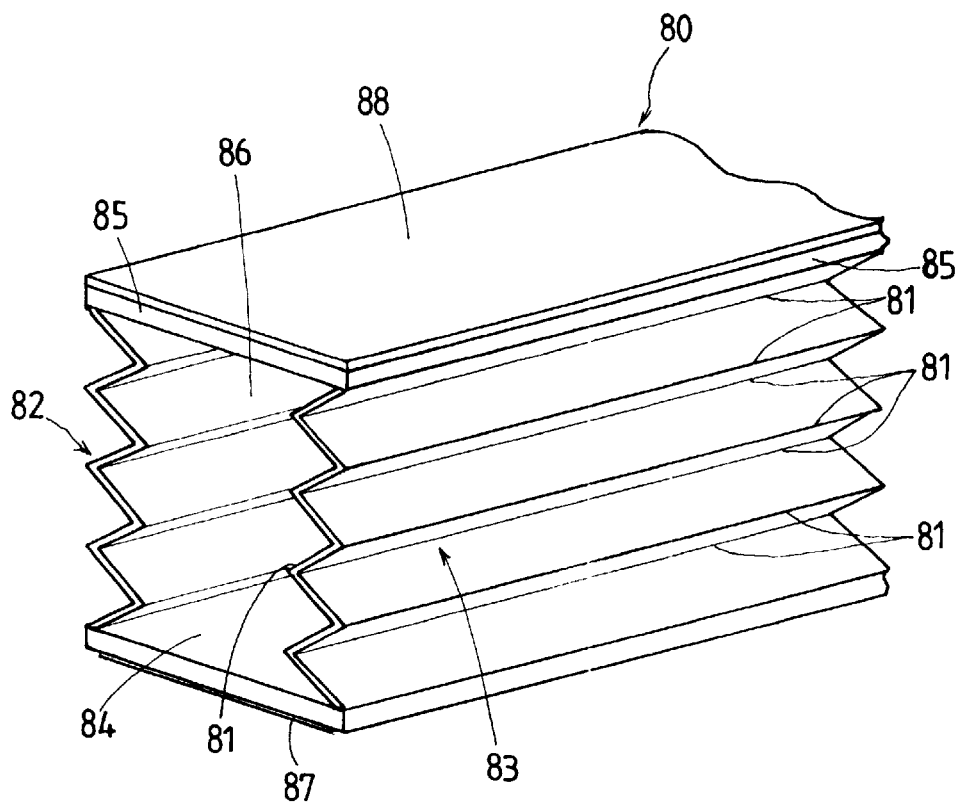
FIG. 11 is a fragmentary perspective view showing an expansible sealing member adapted to use for the sealing means according to the present invention.

FIG. 11 is a fragmentary perspective view of an exemplary expansible sealing member 80 adapted for the sealing members 40, 50 and 60 (60a, 60b) described in conjunction with the embodiments of the present invention. The expansible sealing member 80 has the confronting bellows-like members 82, 83 made of synthetic resins, rubbers or the like, each of which is corrugated with folds 81 extending in parallel with the moving direction of the sliding element 3. The expansible sealing member 80 may expand and contract along the vertical direction in the drawing owing to the own elasticity of the bellows-like members 82, 83. The expansible sealing member 80 is formed in a hollow structure closed around the periphery thereof by the combination of a pair of the confronting bellows-like members 82, 83 arranged in parallel with each other so as to extend along the lengthwise direction of the track rail, and the flat sheets 84, 85 connected with the bellows-like members 82, 83 at their opposing lengthwise edges. By closing the lengthwise opposing ends of the expansible sealing member 80, an air-tight plenum 86 may be provided, which may be filled with a gaseous material such as air or a liquid material such as water. As the lateral extensions 44, 54, 64 and 74 of the flanges 13 move so as to successively collapse the sealing members 80, the fluid thus confined in the plenum 86 is successively squeezed and consequently displaced from the collapsed portions to the expansile portions in the plenum, thereby intensifying the pressure coming into action so as to urging the sealing members against the upper and lower surfaces of the lateral extensions of the flanges 13, resulting in enhancing the sealing or dustproof performance. The expansible sealing member 80 may be alternatively made from a single member by bending and corrugation, instead of being formed from a pair of bellows-like members 82, 83 described just above.

Any one of the sheets 84, 85 of the expansible sealing member 80, for example, the sheet 84 to be secured on its confronting surface, may be applied previously with a two-sided adhesive tape 87, which is coated with a protective skin easy to be peeled off. On this design, the sealing member 80 may be immediately attached onto the railhead 20 of the side wall 7 in the track rail 2 or the undersurface 19 of the dustproof cover 15 by simply peeling off the protective skin from the adhesive tape 87. As an alternative, the other sheet 85 is applied with a magnetic metal tape 88, while a magnetic synthetic resin tape 88 is arranged on the railhead 20 of the side wall 7 in the track rail 2 or the undersurface 19 of the dustproof cover 15, which confronts the sheet 85. According to this alternative, the expansible sealing member 80 may close reliably the gaps or clearances by the action of the magnetic attraction over the major region other than the area where the moving flanges separate the sealing member 80 away from the confronting surface, with no fear of accidental separation of the expansible sealing member 80 away from its confronting surface, so that the sealing performance may be improved.

As the present invention may be embodied in several forms without departing from the spirit of essential characteristics thereof, the present embodiments are therefore illustrative and not restrictive, since the scope of the invention is defined by the appended claims rather than by the description preceding them, and all changes that fall within meets and bounds are therefore intended to embraced by the claims.

What is claimed is:

1. A sliding unit with sealing means, comprising a track rail having a pair of lengthwise side walls opposing to each other widthwise of the tack rail, a sliding element moveable on the track rail, a dustproof cover arranged extending lengthwise of the track rail over both the track rail and sliding element, flanges for supporting thereon an object to be loaded on the sliding element, the flanges being formed integrally with the sliding element so as to extend through gaps between the confronting surfaces of the dustproof cover and the side walls of the track rail, and elastically expansible sealing members arranged to close the gaps, the sealing members being each secured at one lengthwise edge thereof to any one of the dustproof cover and the associated side wall of the track rail and kept at the other edge thereof in sliding contact with the flanges constantly whenever the sliding element moves on the track rail whereby the sailing members are subject to the elastic expansile and collapsed deformation as the flanges pass through the gaps on the movement of the sliding element along the track rail, wherein the expansible sealing members are each comprised of at least one pair of confronting folding bellows having folds extending in parallel with the moving direction of the sliding element.

2. A sliding unit with sealing means, constructed as defined in claim 1 wherein the expansible sealing members are secured at the lengthwise edges thereof to top surfaces of the side walls of the track rail while brought at the other edges thereof into contact with an undersurface of the dustproof cover and kept in sliding contact with undersides of the flanges.

3. A sliding unit with sealing means, constructed as defined in claim 1 wherein the expansible sealing members are secured at the lengthwise edges thereof to the undersurface of the dustproof cover while brought at the other edge thereof into contact with the top surfaces of the side walls of the track rail and kept in sliding contact with upper sides of the flanges.

4. A sliding unit with sealing means, constructed as defined in claim 1 wherein any one of the expansible sealing members is composed of at least one pair of expansible sealing sub-members, one of which is secured at one lengthwise edge thereof to any one of the dustproof cover and the side wall of the track rail, the other sub-member being secured at one lengthwise edge thereof to the other of the dustproof cover and the side wall of the track rail, and the flanges are movable between the sealing sub-members along the track rail in a sliding contact with the confronting free edges of the sealing sub-members.

5. A sliding unit with sealing means, constructed as defined in claim 1 wherein the flanges are each provided with fore-and-aft tapered ends at which surfaces being in contact with the expansible sealing members are inclined with respect to the moving direction of the flanges, whereby the expansible sealing members may collapse and expand successively and gradually with the movement of the flanges on the track rail.

6. A sliding unit with sealing means, constructed as defined in claim 1 wherein the expansible sealing members comprising said at least one pair of confronting folding bellows are connected at lengthwise edge thereof with each other by means of a pair of sheets. lengthwise edge thereof with each other by means of a pair of sheets.

7. A sliding unit with sealing means, constructed as defined in claim 6 wherein a fluid is contained in each space defined by the folding bellows-like members and the sheets for the expansible sealing members.

8. A sliding unit with sealing means, constructed as defined in claim 6 wherein any one of the sheets of the expansible sealing member, being in sliding contact with the flanges, is applied with an antifriction tape to reduce the sliding resistance between the flanges and the expansible sealing members.

9. A sliding unit with sealing means, constructed as defined in claim 8 wherein the antifriction tape is made of magnetic tape while the side walls of the track rail and the dustproof cover contain magnetic substance so as to be brought into a detachable contact with the antifriction tape by the action of magnetic attraction.

* * * * *